3,673,023
PROCESS OF PRODUCING REINFORCED
LAMINATE
William C. Ross, Winchester, Mass., assignor to
W. R. Grace & Co., Cambridge, Mass.
Filed June 24, 1970, Ser. No. 49,396
Int. Cl. B29h 7/22; B32b 3/12, 31/26; F16g 1/10
U.S. Cl. 156—137
3 Claims

ABSTRACT OF THE DISCLOSURE

Flexible laminated products such as printing blankets, belts, and the like of exceptionally high tensile strength are made by laying helically wound, continuous reinforcing cords in what is essentially a screw thread or threads extending between the lateral margins. A guide which automatically lays the cord in the helical groove bears teeth engaging the grooves on the base ply. Grooves are deep enough to house the cord. Walls between successive turns are thick enough to insulate the cords and prevent abrasive contact. The product is finished by a top ply laid over the wound carcass.

---

Figure 1:
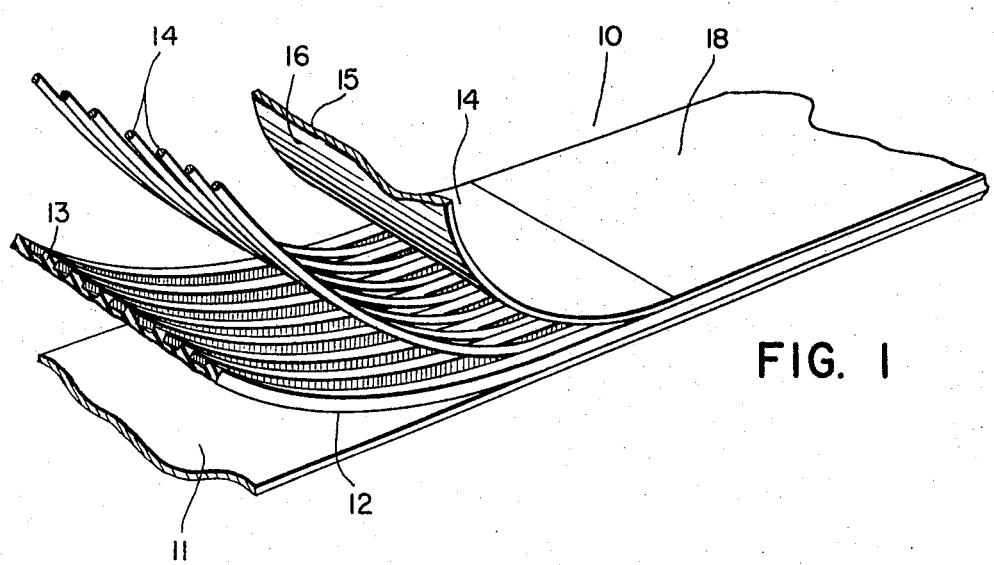

This invention relates generally to endless flexible laminated structures, and partcularly to articles such as printing blankets, belts, and the like where high tensile strength is a requisite, or a strong, stable, flexible product is needed.

As the specification proceeds, it will become obvious that a considerable number of products ranging from textile roller press and screen printing blankets to strong, reinforced material for portable tank walls can be made by the process herein disclosed. For the purpose of illustration, however, and as the preferred example, a wash blanket specifically designed for use on a roller press textile printing range will be described.

For same years, it has been customary to print textiles, not on a cloth back gray, but on a so-called "wash-blanket" which picks up and carries away the color which is driven through the textile as the textile is being printed. The development of wash blankets materially reduced the cost of printing, because a wash blanket avoids the use of back grays as well as the cost of washing and discharging color from the grays before they can again be used.

The wash blanket process was greatly improved by the appearance of wash blankets having various surface treatments, but particularly by one blanket having a surface composed of very fine troughs and ridges capable of carrying away the quantity of ink which had been driven through the goods.

In textile printing, long life and freedom from producing any mark-off or image due to the printing blanket itself is a requisite. In the case of screen printing, extreme step-and-repeat accuracy is essential, and in both instances it follows that the blanket must have a surface which can be cleanly washed and dried before that portion of the blanket re-enters the printing station.

In many printing ranges the blanket is used as the power transmitting means and delivers power, e.g., to the washer or dryer as well as acting as an impression and color receiving blanket.

One of the difficulties of such a blanket has been the splice. Frequently, there are density differences in the splice area that can cause mark-offs on the printed goods. Although the joints in the various plies may be staggered in the splice area, it is the usual experience that the splice is weaker than the body of the blanket.

By the present invention, these difficulties have been substantially overcome. The strength of the blanket across the splice area is nearly equal to the strength of the blanket in its body areas. The present blanket relies for its strength upon a helix or several helices, preferably made from continuous lengths of cord. Essentially non-stretchable cords are used and may be, e.g., glass yarn, tensilized rayon, prestressed cotton and various polyesters such as polyethylene terephthalate which will not stretch at the design strength limits of the blanket.

The unique feature of the present blanket is that the reinforcing cords can be laid on the base layer in such a manner that their position is automatically indexed. No cord can cross or even touch an adjacent cord, but each cord in the finished blanket is completely surrounded by walls of "rubber."

The blanket is made from at least three elements: (1) a base or what may be called the "cylinder ply" which runs in contact with the drive roll, (2) the reinforcing ply which is formed by the continuous helical loops of yarn, and (3) the surface or the working ply which may, in textile printing, carry away the surplus color which is driven through the goods.

In the usual circumstances, the plies are made of a textile coated with a vulcanizable rubber compound, but a textile base or textile working ply in a few instances may not be desired. In such a case, the ply is a sheet of a tough, elastomeric material which will retain the design or embossing which is later given to it. A good example is thermoplastic polyurethane which is mechanically stable after embossing under a hot roller.

The elements may be multi-layer, and frequently are when the blanket, as in some wash blanket arrangements, is also the drive member for the entire printing range.

The base element of the blanket is formed as follows: the service to which the blanket will be put determines the specific nature of the blanket base—square weave, light canvas, etc. The base in open length is then coated with a rubber compound, the thickness of which is determined by the diameter of the blanket reinforcing cords.

After the base element has been removed from the spread or roll coater, it is grooved by running it under a heated and grooved roll which is brought to bear on the rubber coating.

The lands on the roller are parallel and have sufficient dimensions to form a groove in the coating large enough to house the strand of yarn which later will be wound around the blanket loop. In the grooving step, the vulcanization of the rubber coating on the cylinder ply is carried only to about 30% of the final value. The criterion is that the rubber coating shall be advanced to a point where the dimensions of the rubber grooves and lands are permanent, so that the ply can be handled without distorting the surface configuration. But it must not be advanced to a point which affects the uniting of the top ply with the body layers.

The base element is then removed from the embossing apparatus and taken to a splicing station where the two ends are joined in the following manner: one groove, often the groove which follows the center line of the base ply, is identified and marked at both ends of the ply, then the ply is turned upside down and one end is fitted into a pattern member engraved in the same manner as is the base ply. The other end is brought up and butted against the trimmed end which already is lying on the pattern. Permanent or temporary splicing tapes hold the ends together.

However, the free end is offset one or more grooves and fitted into the pattern so that, in effect, a groove becomes a continuous helical thread. Offsetting permits a strand to be wound into the groove continuously from one margin of the ply to the other. In the examples which follow, the offset is three grooves to permit three strands to be wound simultaneously into the grooves of the base ply.

When this operation is complete,, the base ply is covered with a winding of inextensible yarn. Each single loop of the winding is insulated from its neighbor by the amount of rubber in the walls of the groove. Nowhere do the yarns touch or have opportunity to rub on each other.

The machine on which the cord winding takes place essentially is two rolls, one of which is driven and over which the loop of the blanket is stretched. A special guiding apparatus is placed to bear on the thread-embossed based ply just before the crest of the roll is reached. This guide is supported by a traversing head so that it may move freely from one margin of the blanket to the other.

To guide the cord accurately, the guide member pushed downwardly onto the surface of the base ply by a spring has a number of teeth, each of which fits into a groove in the base ply. A particularly useful guide is disclosed in U.S. patent application Ser. No. 049,400, fied June 24, 1970. To reduce friction as much as possible, this guide element is made of polytetrafluoroethylene (Teflon), nylon, or other low friction material.

The packages of glass yarn are placed on a stand behind the winding machine. The yarn is led through conventional tension devices and down over guides or pulleys on tension pendulums so that as the blanket loop moves, the glass yarns are pulled smartly into the groove. They are held against displacement by a thin coating of adhesive which is spread over the ply before the winding operation begins. Since the base ply is free of slack and under a controlled mild tension, the yarn is laid on the base ply with substantially uniform tension which remains uniform as the whole surface of the base ply is wound.

Following the winding operating, the ply is covered with a working face layer. In a number of instances, this layer has the same construction as has the base ply, and is laid, rubber face down, on top of the cords.

When the top ply has been positioned on the carcase, the loop is transferred to blanket curing apparatus. A continuous curing machine or a platen press may be used in the final curing or vulcanizing step.

Should the blanket be a textile wash blanket with grooves to hold color, the curing roll has a finely grooved face.

Should the blanket be fabric faced, or should it have an impervious rubber working surface, the curing roll is smooth and polished.

The blankets which are formed in the manner just described are so strong that they can be substituted for the steel compression member of a continuous rotary blanket curing machine, with great advantage in roll size and cost. Such a machine is disclosed in U.S. patent application, Ser. No. 049,227, filed June 24, 1970.

Figure 2:
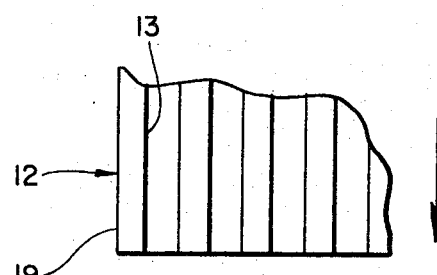
Figure 3:
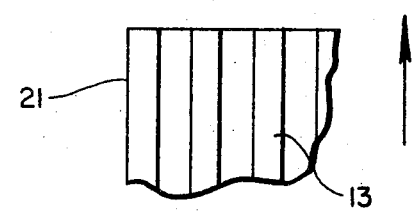
Figure 3:
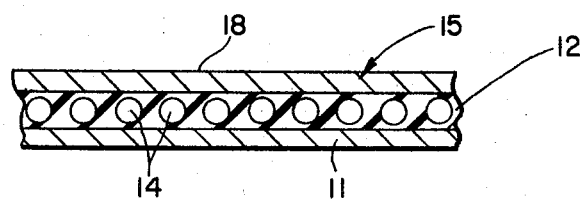

In the drawings:

FIG. 1 is a perspective view of a portion of the blanket with its laminae fanned out to exhibit the structure, FIG. 2 is a diagrammatic top plan view of a small section of the base ply showing the grooves and lands and the set-over in the splice, and FIG. 3 shows, in end view, a blanket in which no textile reinforcement is used.

In FIG. 1, the blanket 10 is built up on a textile ply 11 which carries a rubber coating 12. Coating 12 is grooved as shown at 13. Reinforcing cords 14 lie in grooves 13.

The top element of the blanket is a textile sheet 15 coated on both sides with rubber. Its lower face 16 adheres to the cords and to the grooved rubber coating 12. Its upper face 17 forms an impervious rubber working surface 18.

In FIG. 2, the method of producing an helical groove to permit a cord to be wound continuously across the width of the blanket is shown. One end 18 of the grooved base is butted against the opposite end 21 in such a manner that the continuous groove 13 is moved one groove to the right as the two ends of the base element are joined together. Therefore a cord 14 wound in the groove 13 finds a continuous path or thread. But when more than one cord is to be wound on the base element as simultaneously laid parallel strands, the grooves 13—13, on the respective ends of the base element 19 and 21 should be offset to accord with the number of cords which will be wound at that time.

Any guide device which accurately will lay the yarn in the grooves or threads formed in the base element can be used, but a far preferable device, because of its simplicity and automatic action, is the yarn guide described in the previously identified application, S.N. 049,400, which application is incorporated herein by refrence. Briefly, the yarn guiding device clamps to a traversing head of a winding frame along which it is driven by the engagement of teeth formed on its spring-pressed bottom surface with the grooves which have been formed in the base element 11. Slots (or eyelet holes) in the same spring-pressed element guide the reinforcing yarns directly into the groove 17, as the guide is carried across the width of the blanket when the blanket moves beneath the traversing head.

EXAMPLE I

A cylinder ply of polyester (Dacron), heat-set at 425° F., of a square-woven, 11.2 ounce weight per square yard, of yarn size 12/2, was coated with a curable rubber compound applied at the rate of 120 pounds per 100 square yards. The rubber composition was as follows:

|  | Parts |
|---|---|
| Nitrile rubber | 166.0 |
| Sulphur | 10.0 |
| Zinc oxide | 5.7 |
| Stearic acid | 1.7 |
| Antioxidant | 3.4 |
| Paraffin wax | 5.0 |
| Carbon black (P33) | 50.0 |
| Goodright vitrol [1] | 3.4 |

[1] Vitrol: The ply was grooved under a roll producing 15 grooves of 0.040 width per linear inch, and 0.030 deep. The cure was but for four minutes at a temperature of 300° F. The ply was made into an endless loop joined by glass tape with the grooves offset three grooves to give a three-flight screw thread. The loop was wound with glass thread, Owens-Corning ECG75/5/3. The face or working ply was coated with the same rubber compound on the same square-weave Dacron fabric used for the cylinder ply. The adhesive compound, however, in addition to the ingredients listed, had 20 parts by weight of phenolic resin (Union Carbide #2400) added to better the adhesion.

The blanket loop with the face ply in position was then placed on a rotary curing apparatus. Its hydraulic cylinders were adjusted to produce a belt tension of 470 pounds per linear inch. The curing roll was a smooth, polished roll heated by steam at 80 pounds pressure.

The tensile strength of this blanket, when tested by an Instron machine, exceeded 2000 pounds per linear inch.

EXAMPLE II

A blanket was made to the same specifications as those given in Example I, except that the top ply fabric was cotton of 10.25 ounces per square yard. The warp threads were 20/2, fill threads 20/2, warp ends 65, fill pickup 54. This material was coated with the same compound as used in Example I, at the rate of 120 pounds per hundred square yards. The top surface of the ply was coated with the same composition at the rate of 90 pounds per hundred square yards to form a rubber working surface. Tthe blanket was cured under a belt tension of 470 pounds per linear inch, using a smooth polished roll heated by steam at 80 pounds pressure.

Both blankets of Examples I and II were completely smooth and gave no evidence of a splice.

EXAMPLE III

Sheet stock of a proprietary polyurethane compound (Estane 5702) was sheeted out in a heated calendar at 300° F. The sheet was then run under a grooving roll which produced 15 grooves of 0.040″ width per linear inch 0.030″ deep. The grooved base element was stable immediately after cooling. The ends of the grooved sheet were butted in the manner which has been described in Example I, and the loop was spliced with glass tape. The grooved loop was then placed on a winding frame and glass yarns (Owens-Corning ECG75/5/3) were wound on to the loop in the manner described in Example I. Following the winding operation, the yarn face was covered with a sheet of the same polyurethane compound, 0.040" thick. The "laid-up" blanket, laid between sheets of polished stainless steel, was then pressed in an hydraulic press. The blanket was passed through the press in a step-and-advance manner until the whole loop had been pressed. Step marks showed, but they were not deep enough to cause difficulty in printing.

A major advantage which flows from this method of manufacture is that no yarns can ever cross or come in contact with each other. This is a serious difficulty in any blanket, but when glass yarns are used and do cross or rub on each other, internal failure develops very quickly. In such huge and expensive products as textile printing blankest failures are extremely costly.

The very high tensile strength which this type of construction develops, and because of its reduction in the cause of internal failure, the invention makes significant improvement in blankets, belts, and articles which must work at high stress or in rolling compression.

In the foregoing specification and in the claims, the word "rubber" has been used in its present-day generic sense, and is not intended to refer to a specific chemical composition. It may include such varied substances as natural rubber, nitrile rubbers, polyurethane compounds, and, in fact, any of the commonly used elastomeric compositions having the properties appropriate to the specific service which the product must meet. All such substances may be used as the embedment and surface elements of this invention.

I claim:
1. The process of producing reinforced, flexible, laminated products which includes the following steps:
    (a) passing a thermoplastic base element under a heated grooved roller to form parallel grooves therein extending from end to end,
    (b) bringing the ends of the grooved base element together and offsetting one or more of the grooves so that at least one continuous groove is formed extending helically from adjacent one margin of the base to the opposite margin,
    (c) winding into the grooves of the said element a continuous strand of yarn having a diameter such that the yarn will fit substantially completely within the dimensions of the groove to form a blanket carcass,
    (d) covering the said carcas with material to form a face layer, then,
    (e) curing the blanket by heat and pressure whereby a consolidated, unitary blanket is produced in which the successive turns of the reinforcing cords are completely separated and each cord is completely encapsulated.
2. The process of claim 1 wherein said base element is a rubber coated textile, the said grooves are formed under pressure at a temperature and for a time only sufficient to give stability to the grooves and lands so formed, the said carcass is covered with a rubber coated textile top layer and the assembly is cured under heat and pressure.
3. The process of claim 1 wherein said base element comprises an elastomer.

References Cited
UNITED STATES PATENTS

| | | | |
|---|---|---|---|
| 3,418,864 | 12/1968 | Ross | 161—95 X |
| 3,122,934 | 3/1964 | Fihe | 161—144 X |
| 2,239,635 | 4/1941 | Walton | 156—137 |
| 2,338,447 | 1/1944 | Lenart et al. | 161—144 X |
| 2,439,043 | 4/1948 | Evans | 156—140 |

FOREIGN PATENTS

| | | | |
|---|---|---|---|
| 201,200 | 1/1955 | Australia | 156—137 |

WILLIAM A. POWELL, Primary Examiner

U.S. Cl. X.R.

74—232; 156—172, 176, 257, 268; 161—47, 144, 401